US010286811B2

(12) United States Patent
Beuschel et al.

(10) Patent No.: US 10,286,811 B2
(45) Date of Patent: May 14, 2019

(54) DEVICE FOR PNEUMATICALLY ADJUSTING A SEAT IN A TRANSPORT MEANS, IN PARTICULAR A MOTOR VEHICLE

(71) Applicant: Conti Temic microelectronic GmbH, Nürnberg (DE)

(72) Inventors: Michael Beuschel, Stammham (DE); Mehmet Cini, Kipfenberg (DE); Johann Riepl, Denkendorf (DE)

(73) Assignee: Conti Temic microelectronic GmbH, Nürnberg (DE)

( * ) Notice: Subject to any disclaimer, the term of this patent is extended or adjusted under 35 U.S.C. 154(b) by 291 days.

(21) Appl. No.: 15/108,366

(22) PCT Filed: Jan. 21, 2015

(86) PCT No.: PCT/EP2015/051162
§ 371 (c)(1),
(2) Date: Jun. 27, 2016

(87) PCT Pub. No.: WO2015/113880
PCT Pub. Date: Aug. 6, 2015

(65) Prior Publication Data
US 2016/0339803 A1    Nov. 24, 2016

(30) Foreign Application Priority Data

Jan. 30, 2014    (DE) .................. 10 2014 201 663

(51) Int. Cl.
*B60N 2/02*    (2006.01)
*B60N 2/90*    (2018.01)
(Continued)

(52) U.S. Cl.
CPC ......... *B60N 2/0244* (2013.01); *B60N 2/0224* (2013.01); *B60N 2/0284* (2013.01);
(Continued)

(58) Field of Classification Search
CPC ...... B60N 2/02; B60N 2/0244; B60N 2/0276; B60N 2/1878
See application file for complete search history.

(56) References Cited

U.S. PATENT DOCUMENTS 4,187,682 A     2/1980   Shen
5,842,738 A *  12/1998   Knoll .................... B60R 21/207
                                                              297/216.12
(Continued)

FOREIGN PATENT DOCUMENTS

CN       1968837 A      5/2007
DE       3505088        11/1986
(Continued)

OTHER PUBLICATIONS

Chinese Office Action for Chinese Application No. 201580006064.5, dated May 31, 2017, including English translation, 13 pages.
(Continued)

*Primary Examiner* — Barry Gooden, Jr.
(74) *Attorney, Agent, or Firm* — RatnerPrestia

(57) ABSTRACT

A device for pneumatically adjusting a seat in a transport vehicle, in particular in a motor vehicle, including one or more adjusting devices, each of which includes a pneumatic actuating device for adjusting the seat by generating pneumatic pressure, and including a trigger device, which the actuating device is switched from a standby state to an active state in response to a trigger signal when the device is being operated. The pneumatic actuating device brings about an adjustment of the seat in the active state. The pneumatic actuating device is designed such that the actuating device is mechanically preloaded in the standby state, and the mechanical preload is released in the active state in order to thus bring about the adjustment of the seat.

16 Claims, 4 Drawing Sheets

(51) Int. Cl.
   *B60N 2/16*     (2006.01)
   *B60N 2/18*     (2006.01)
   *B60N 2/427*    (2006.01)
   *B60N 2/22*     (2006.01)

(52) U.S. Cl.
   CPC ......... *B60N 2/1665* (2013.01); *B60N 2/1878* (2013.01); *B60N 2/22* (2013.01); *B60N 2/42763* (2013.01); *B60N 2/914* (2018.02); *B60N 2/99* (2018.02); *B60N 2002/026* (2013.01); *B60N 2002/0256* (2013.01); *B60N 2002/0268* (2013.01)

(56) References Cited

U.S. PATENT DOCUMENTS

| | | | |
|---|---|---|---|
| 5,971,027 | A | 10/1999 | Beachley et al. |
| 6,036,266 | A * | 3/2000 | Massara ............... B60N 2/10 297/328 |
| 6,873,892 | B2 | 3/2005 | Katz |
| 7,909,403 | B2 | 3/2011 | Lawall |
| 2005/0077762 | A1 * | 4/2005 | Kraemer ............. B60N 2/865 297/216.12 |
| 2007/0289398 | A1 | 12/2007 | Genter et al. |
| 2009/0218858 | A1 * | 9/2009 | Lawall ............... B60N 2/4235 297/216.1 |
| 2009/0218859 | A1 * | 9/2009 | Lawall ............... B60N 2/42763 297/216.1 |
| 2010/0066142 | A1 * | 3/2010 | Gross ............... B60N 2/42763 297/284.1 |
| 2012/0098244 | A1 * | 4/2012 | Browne ............... B60R 21/13 280/801.1 |
| 2013/0270877 | A1 * | 10/2013 | Hoyle ............... B60N 2/24 297/216.1 |

FOREIGN PATENT DOCUMENTS

| | | |
|---|---|---|
| DE | 3829646 A1 | 3/1990 |
| DE | 4032875 A1 | 4/1992 |
| DE | 4202905 A1 | 8/1993 |
| DE | 29815521 | 12/1998 |
| DE | 20021992 | 5/2002 |
| DE | 102005016184 | 10/2006 |
| DE | 102007056684 | 5/2009 |
| DE | 112009000495 | 2/2011 |
| DE | 102009051380 | 5/2011 |
| EP | 1192061 | 7/2004 |
| GB | 2263753 A | 8/1993 |
| WO | 2005123445 | 12/2005 |

OTHER PUBLICATIONS

International Search Report and Written Opinion of the International Searching Authority for International Application No. PCT/EP2015/051162 dated Apr. 2, 2015.

German Examination Report for German Application No. 10 2014 201 663.0 dated Aug. 12, 2014.

* cited by examiner

DEVICE FOR PNEUMATICALLY ADJUSTING A SEAT IN A TRANSPORT MEANS, IN PARTICULAR A MOTOR VEHICLE

CROSS REFERENCE TO RELATED APPLICATIONS

This application is the U.S. National Phase Application of PCT International Application No. PCT/EP2015/051162, filed Jan. 21, 2015, which claims priority to German Patent Application No. 10 2014 201 663.0, filed Jan. 30, 2014, the contents of such applications being incorporated by reference herein.

FIELD OF THE INVENTION

The invention relates to an apparatus for the pneumatic adjustment of a seat in a transportation means, in particular in a motor vehicle.

BACKGROUND OF THE INVENTION

In transportation means, and in particular in motor vehicles, increasing use is being made of pneumatically actuated adjustment devices by way of which the position and in particular the contour of a seat can be suitably adapted. Inter alia, dynamic seat adjustment means are known which make it possible for the seat user to be supported in a manner dependent on the driving situation, for example during cornering maneuvers or in the presence of lateral accelerations (see DE 35 05 088 C1), which is incorporated by reference.

To achieve a fast adjustment time of a pneumatic seat adjustment, a very powerful pneumatic pressure supply is required, which in turn leads to a large structural space requirement, high noise emissions and high costs. Alternatively, it is duly also possible to use a less powerful pressure supply in combination with an additional storage volume (see DE 10 2005 016 184 A1), which is incorporated by reference. However, said storage volume also requires a considerable amount of structural space.

Furthermore, from the prior art, approaches are known which reduce the dynamics required for a seat adjustment by virtue of the control of the seat adjustment being advanced. In documents EP 1 192 061 B1, which is incorporated by reference and DE 10 2009 051 380 A1, which is incorporated by reference, stored data relating to the road profile is taken into consideration for this purpose.

SUMMARY OF THE INVENTION

An aspect of the invention provides an apparatus for the pneumatic adjustment of a seat in a transportation means, and in particular in a motor vehicle, which apparatus permits a simple and fast adjustment of the seat, with the apparatus simultaneously taking up a small structural space and having a low level of operating power.

The apparatus according to an aspect of the invention serves for the pneumatic adjustment of a seat in a transportation means, and in particular in a motor vehicle. In the apparatus there are provided one or more adjustment devices, wherein a respective adjustment device comprises a pneumatic actuating device for the adjustment of the seat and preferably of the contour of the seat by way of pneumatic generation of pressure, and a triggering device. By way of the triggering device, the actuating device is, during the operation of the apparatus, transferred from a standby state into an activated state in response to a triggering signal. The pneumatic actuating device effects an adjustment of the seat, and in particular of the seat contour, when in the activated state.

The apparatus according to an aspect of the invention is distinguished by the fact that the pneumatic actuating device is designed such that it is mechanically preloaded in the standby state, and the mechanical preloading is released in the activated state in order to thereby effect the adjustment of the seat. The pneumatic actuating device may be designed differently depending on the embodiment. The actuating device preferably comprises a positive-pressure or negative-pressure actuator and/or an air bladder and/or a pneumatic stroke element (for example a stroke cylinder).

An aspect of the invention has the advantage that, by way of the mechanical preload of the pneumatic actuating device, a fast adjustment of the seat during the transfer from the standby state into the activated state can be achieved, without the need for a pressure generator with high power and large structural space requirement to be provided for this purpose. Rather, an adequate mechanical preload can be built up already in preparatory fashion using pressure generators of low power, which preload is then available, in the activated state, for the fast adjustment of the seat.

The abovementioned triggering signal for the transfer into the activated state may, depending on the embodiment, be coupled to different criteria. For example, the triggering signal may be output when certain accelerations, such as for example a lateral acceleration, exceed a predefined value, such that a person in the seat is thereby provided with suitable lateral support. Nevertheless, the triggering signal may possibly also be generated manually by a user.

In a particularly preferred embodiment, the pneumatic actuating device in at least one adjustment device is designed such that, in the standby state, a positive pressure or a negative pressure is generated in the pneumatic actuating device. Said positive pressure or negative pressure may be generated for example by way of a suitable pump or a compressor or similar devices.

In a further embodiment, the pneumatic actuating device in at least one adjustment device is designed such that, in the activated state, said pneumatic actuating device effects the movement of a movable flap which preferably forms a part of the seat contour, wherein the flap is held in a static position when the pneumatic actuating device is in the standby state. The flap is preferably articulatedly connected to a structure in the seat. In this variant of the invention, a conversion of the released preload into the mechanical movement of a flap is effected in a simple manner. In a preferred variant, the flap extends, at one side of the backrest of the seat, in the longitudinal direction of the backrest, in order thereby to provide a person situated in the seat with suitable lateral support.

In a particularly preferred variant, the above-described flap can be arranged in multiple different positions, preferably by way of the triggering device, when the pneumatic actuating device is in the activated state. In this way, a flexible adjustment of the flap and thus of the seat is achieved.

In a further embodiment of the invention, the actuating device comprises a first (elastic) air bladder which can be filled by way of a compressed-air supply. Here, it is not imperatively necessary for further air bladders to be provided in addition to the first air bladder. When the pneumatic actuating device is in the standby state, the first air bladder is filled such that it presses against the flap, which is arrested in the standby state, wherein, by way of the triggering device, in response to the triggering signal, the arresting of the flap is released, which effects the expansion of the first air bladder and, as a result, the movement of the flap for the adjustment of the seat. The arresting of the flap in the standby state of the pneumatic actuating device is realized preferably by way of positive locking and/or frictional locking.

In a further preferred embodiment, the first air bladder is connected to a compressed-air supply by way of a valve arrangement composed of one or more valves, in such a way that, by way of the control of the valve arrangement, filling of the first air bladder by way of the compressed-air supply for the purposes of establishing the standby state, and an evacuation of the air bladder after the ending of the activated state, are achieved, wherein automatic arresting of the flap is preferably effected upon the evacuation of the first air bladder. With this variant of the invention, a mechanism of simple construction is provided for the movement of the flap and thus for the seat adjustment.

In a further variant of the apparatus according to an aspect of the invention, the triggering device in at least one adjustment device comprises a second (elastic) air bladder, wherein it is not imperatively necessary for a first air bladder to also be provided. The second air bladder is filled or evacuated in response to the triggering signal, whereby the actuating device is transferred from the standby state into the activated state. Depending on the embodiment, filling of the second air bladder may be effected by way of compressed air from a compressed-air supply, or possibly also by way of compressed air from the above-described first air bladder (if present).

In a further embodiment of the apparatus according to an aspect of the invention, there is articulatedly connected to the above-described flap a further flap which, when the pneumatic actuating device is in the standby state, effects arresting of the flap by way of positive locking, wherein the triggering device releases the positive locking, by exertion of force on the further flap, in response to the triggering signal. In particular, this embodiment is combined with a triggering device which comprises a second air bladder, which then releases the positive locking by exerting force or pressure on the further flap.

In a further variant of the apparatus according to an aspect of the invention, the triggering device is designed such that it can stop the movement of a wedge-shaped or stepped element in a guide at different positions in the guide by way of frictional locking. The triggering device preferably comprises the above-described second air bladder, which is evacuated in response to the triggering signal and, here, in a manner dependent on its filling state, can stop the movement of the wedge-shaped or stepped element at different positions by way of frictional locking. For this purpose, the second air bladder is preferably arranged in the guide. The movement of the wedge-shaped or stepped element is effected by way of the release of the mechanical preload of the pneumatic actuating device in the activated state. Provision is preferably also made of an elastic element which, after the ending of the activated state, moves the wedge-shaped or stepped element back into its initial position again. In a further variant of the apparatus according to an aspect of the invention, the flap forms, by way of an articulated connection, a lever, wherein the pneumatic movement device acts, by way of an elastic element and a pneumatic stroke element, on one end of the lever. Here, the elastic element is mechanically preloaded by way of the pneumatic stroke element in the standby state of the pneumatic actuating device. When the pneumatic actuating device is in the activated state, the mechanical preload of the elastic element is released by way of the stroke element, and in this way, the movement of the flap is effected.

In one embodiment, the above-described pneumatic stroke element comprises a stroke cylinder and/or a positive-pressure actuator and/or an (elastic) air bladder. In the case of an air bladder, the latter preferably comprises an inner, stretchable layer and an outer, flexible and non-stretchable layer, such that the stretching of the inner layer during the filling of the air bladder gives rise to a shortening of the air bladder in a predetermined direction. Said shortening effects the mechanical preloading of the elastic element.

In a further variant of an aspect of the invention, the pneumatic actuating device comprises a negative-pressure actuator in which, in the standby state, a negative pressure is generated and, as a result, the flap is mechanically preloaded by the restoring force of an elastic element that is provided. In the activated state, the negative pressure in the negative-pressure actuation is reduced and, in this way, the restoring force of the elastic element effects a movement of the flap. All of the elastic elements mentioned above may be designed differently depending on the embodiment. In particular, said elastic elements may be realized as suitable spring elements or possibly also as elastic bands.

It is preferably the case that, when the pneumatic actuating device according to the invention is in the activated state, pressure equalization takes place between the pneumatic actuating device (in particular a pneumatic stroke element) and the surroundings. Said pressure equalization does not require the involvement of a compressor, and can thus also take place considerably more quickly than the filling of an actuator by way of a small compressor.

It is preferably the case that, in at least one adjustment device, the establishing of the standby state of the actuating device is coupled to one or more actions of a user, wherein the action or actions preferably comprise(s) one or more of the following actions in a transportation means in the form of a motor vehicle:
  opening a vehicle door of the motor vehicle;
  operating a function for gaining access to the motor vehicle (for example unlocking the motor vehicle using a radio key);
  switching on the ignition of the motor vehicle;
  operating a function for activating a seat adjustment, in particular in a manner dependent on at least one driving dynamics variable.

In the variant described immediately above, it is ensured that, in good time before a triggering signal arises, the actuating device is suitably mechanically preloaded in order to ensure a fast seat adjustment.

In a further preferred variant of an aspect of the invention, immediately after the ending of the activated state of the pneumatic actuating device, the standby state is re-established in order that the mechanical preload is immediately built up again in order to ensure a fast seat adjustment.

Aside from the apparatus described above, an aspect of the invention also comprises a transportation means, in particular a motor vehicle, which comprises one or more of the apparatuses according to the invention, or one or more preferred variants of the apparatus according to the invention, for the adjustment of one or more seats in the transportation means.

BRIEF DESCRIPTION OF THE DRAWINGS

Exemplary embodiments of the invention will be described in detail below on the basis of the appended figures, in which.

DETAILED DESCRIPTION OF THE PREFERRED EMBODIMENTS

Below, variants of an aspect of the invention will be described on the basis of a pneumatic adjustment device for adapting the seat contour of a motor vehicle seat. Here, the seat adjustment will be discussed on the basis of an elongate flap in the seat, which flap extends in the longitudinal direction of the backrest and is denoted in all of the embodiments of FIG. 1 to FIG. 4 by the reference designation 1. The flap forms a part of the seat contour, wherein in each case one flap is provided at the left-hand edge and at the right-hand edge of the seat. In a manner dependent on particular criteria, the flap moves in the direction of the center of the backrest in order to provide lateral support for the person in the seat. The movement of the flap is coupled to a triggering signal which is dependent for example on the lateral acceleration of the vehicle and which, in the presence of an increase lateral acceleration, triggers the movement of the flap in order that the passenger in the vehicle seat is held more securely. The triggering signal may also be coupled to any other desired criteria, and may possibly also be activated manually by the user.

In the embodiments of FIG. 1 to FIG. 4, as described below, each of the figures shows, in a cross-sectional view along a horizontal plane through the backrest, both a flap at the left-hand edge and a flap at the right-hand edge of the backrest. The flap at the left-hand edge of the backrest is always shown, in each figure, in the left-hand part and in a standby state of a corresponding actuating device. By contrast, the right-hand flap is shown in the right-hand part of each figure and in the activated state of the actuating device. Below, for easier explanation, the invention will be described uniformly for the function of a flap, and the same reference designations are used for the same components for the actuation of the left-hand and right-hand flaps.

All of the embodiments described below are distinguished by the fact that the adjustment of the flap 1 is effected by way of a pneumatic actuating device which is mechanically preloaded in a standby state, wherein said preloading is released by way of the above triggering signal with a corresponding triggering device, and the adjustment of the flap and thus of the seat contour is effected in this way. Here, the preload is built up slowly or with low power during inactive phases of the contour adjustment (for example upon opening of the motor vehicle or after the end of the contour adjustment) and is dissipated in the presence of the corresponding triggering signal. By way of the mechanical preloading of the pneumatic actuating device, it is possible to realize a rapid contour adjustment with simultaneously low power of a pressure-generating means for the pneumatic actuating device.

Figure 1:
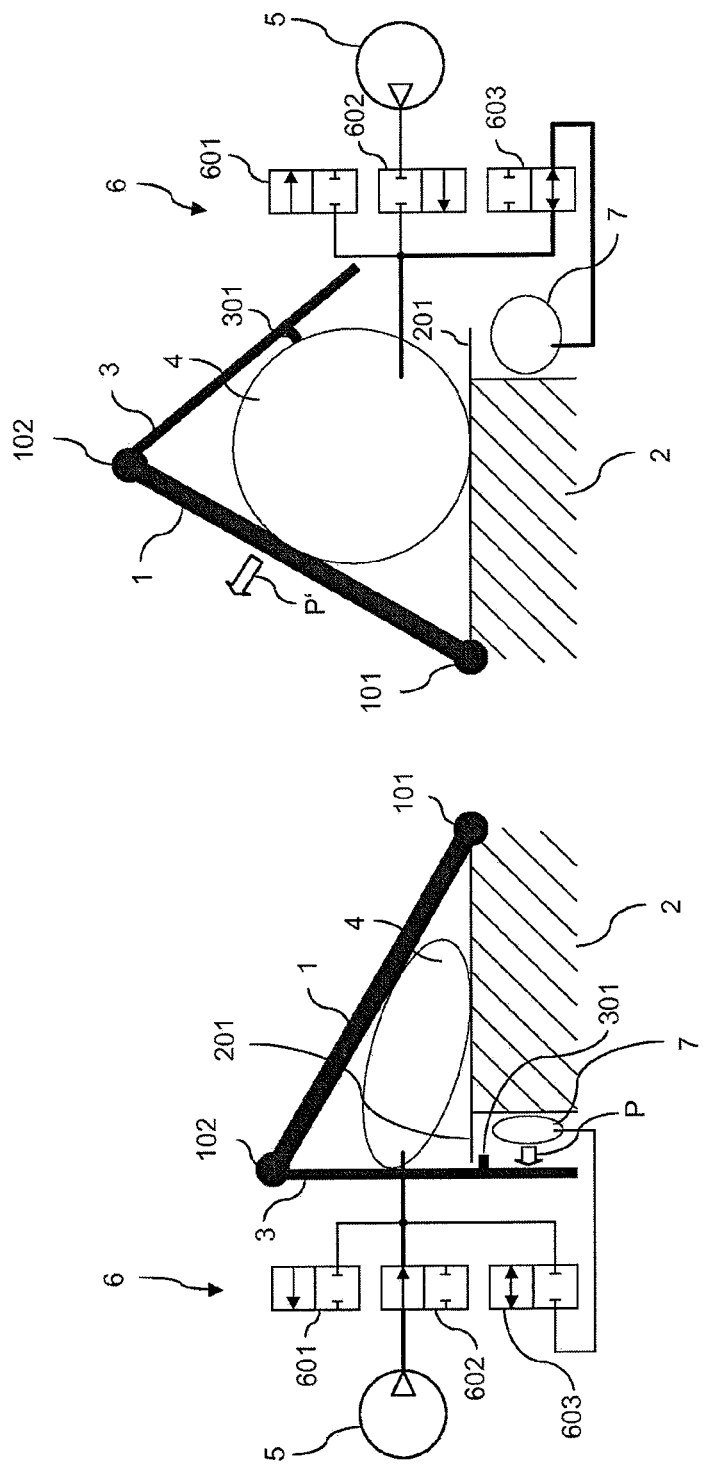
FIG. 1 is a schematic illustration of a first embodiment of an adjustment device according to an aspect of the invention.

In the embodiment of FIG. 1, the flap 1 is rotatably articulatedly connected, at its end 101, to a fixed structure 2 within the motor vehicle seat. To the opposite end 102 of the flap 1, there is furthermore rotatably fastened a further flap 3 which has a projection 301 which, in the standby state in the left-hand part of FIG. 1, forms a positively locking connection with a projection 201 of the structure 2 in the seat. Between the flaps 1 and 3 there is situated a first air bladder 4 which forms a part of a pneumatic actuating device. For the filling of the air bladder, use is made of a compressed-air supply 5 in the form of a compressor. Here, the compressor is connected to the air bladder via a valve arrangement 6. The valve arrangement 6 comprises the three valves 601, 602 and 603. Said valves are 2/2 valves with a first position for the throughflow of compressed air and with a second position for shutting off compressed air. The throughflow directions of the individual valves are indicated by arrows or double arrows. The illustrated interconnection of compressor, air bladder and surroundings may basically also be realized by way of other valve arrangements, for example 3/3 or 3/2 valves.

Aside from the first air bladder 4, the adjustment device of FIG. 1 comprises a second, relatively small air bladder 7, which is likewise connected to the valve arrangement 6 and in particular to the valve 603. As depicted by the arrow P, by way of a supply of compressed air when the valve 603 is in the open position, the air bladder 7 can be inflated, which leads to a transfer from the standby state in the left-hand part of FIG. 1 to the activated state in the right-hand part of FIG. 1, as will be discussed in more detail below.

For the preloading of the actuating device in the standby state, the valve 602 is opened, and compressed air is supplied from the compressor 5 to the air bladder 4. This leads to a pressure being exerted on the flap 1 in the direction of the arrow P', wherein the movement of the flap is prevented as a result of the arresting by way of the further flap 3 by means of the positively locking connection of the projection 301 with the projection 201. When sufficient preload is built up, the valve 602 is shut off and the final standby state is attained. A triggering signal for the triggering of the seat adjustment is then awaited. If a triggering signal of said type arises, the valve 603 is opened, which has the effect that compressed air flows from the second air bladder 4 into the further air bladder 7. This causes an inflation of the air bladder 7 corresponding to the arrow P, which leads to a rotation of the further flap 3 and ultimately to the release of the positively locking connection between the projection 301 and 201. As a result, the prestressed air bladder 4 expands, as illustrated in the right-hand part of FIG. 1. This leads to a rotation of the flap 1 in the direction of the arrow P' and thus to the adjustment of the seat contour in order to ensure better lateral hold. As an alternative, it would also be possible for the valve 603 to be fed directly by the compressor, whereby, in the event of triggering, compressed air flows from the compressor 5 into the air bladder 7.

When the seat contour adjustment has come to an end, for example because a lateral acceleration in the vehicle is decreasing, both the valves 601 and 603 are switched into the throughflow position, whereas the valve 602 is shut off. This leads to the first air bladder being compressed by the seat lining and/or possibly by additional springs. In an alternative embodiment, it would be possible for the valve 603 to then connect the air bladder 7 directly to the surroundings. Here, both air bladders 4 and 7 are ventilated, such that the flaps 1 and 3 move back into their position in the standby state and, in turn, arresting is achieved by way of the positively locking connection by way of the projections 201 and 301. In this state, it is then possible again for the filling of the air bladder 4 to be performed until a suitable preload is reached, and thus for the standby state to be established. The ratio of the volume of the air bladder 4 in the relaxed state in the right-hand part of FIG. 1 to the preloaded state in the left-hand part of FIG. 1 is preferably lower than 2:1, in order to limit the air pressure required for the preloading.

Figure 2:
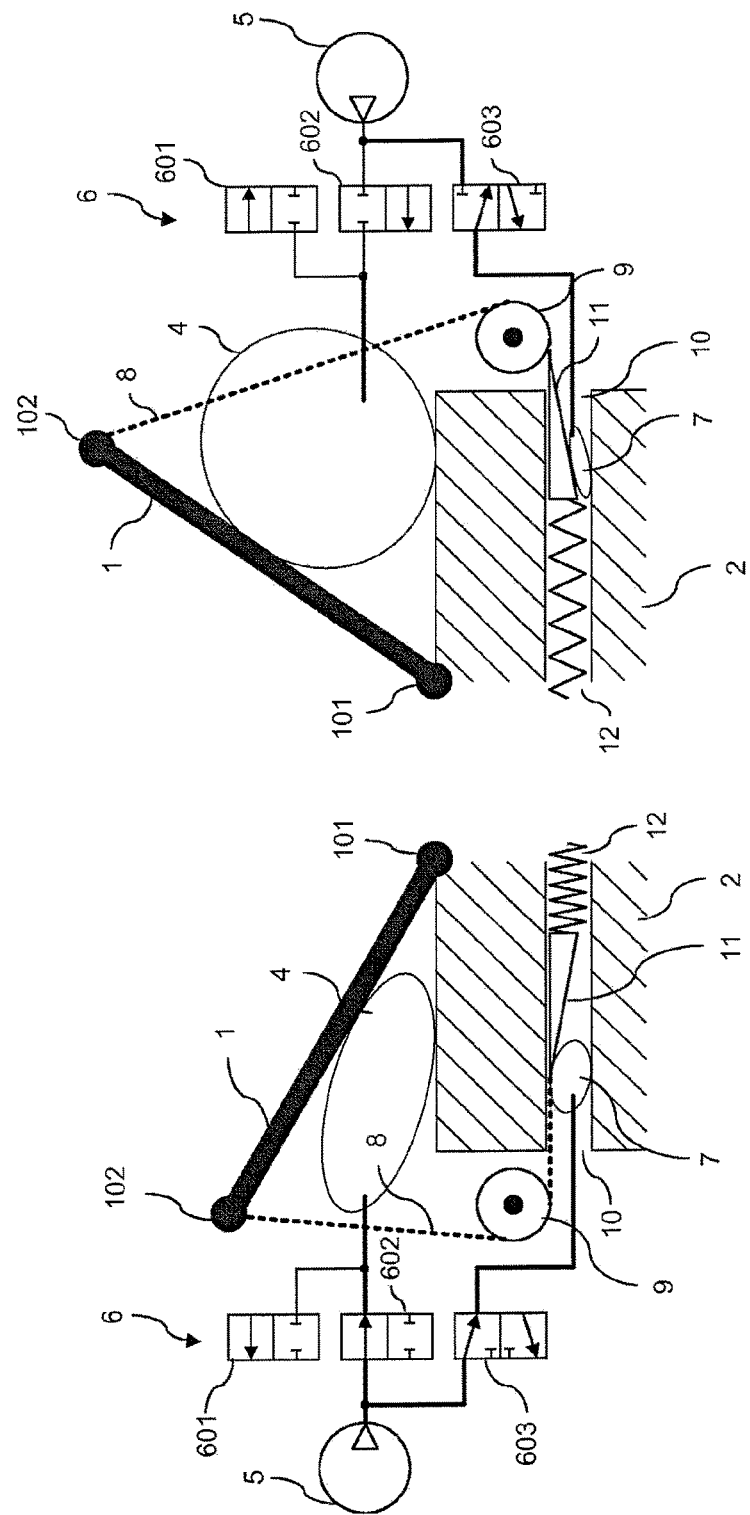
FIG. 2 is a schematic illustration of a second embodiment of an adjustment device according to an aspect of the invention.

FIG. 2 shows a second embodiment of an adjustment device according to an aspect of the invention, which, by contrast to the embodiment of FIG. 1, effects arresting of the flap 1 by way of frictional locking, and which furthermore permits a movement of the flap into various intermediate or end positions. In this way, a variable seat adjustment is made possible, such that the flap is for example moved to a lesser extent in the presence of low lateral accelerations than in the presence of relatively high lateral accelerations.

In the embodiment of FIG. 2, analogously to FIG. 1, a first air bladder 4 and a second air bladder 7 are provided, which are fed with compressed air from the compressor 5 via a valve device 6 composed of three valves 601 to 603. The valves 601 and 602 in this case correspond to the 2/2 valves of FIG. 1. However, by contrast to FIG. 1, the valve 603 of FIG. 2 is a 3/2 valve with three ports and two switching positions, wherein the first switching position connects the compressor 5 to the air bladder 7, and the second switching position effects a ventilation of the air bladder 7.

In the embodiment of FIG. 2, in a guide 10 in the structure 2 adjacent to the air bladder 7, there is arranged a wedge 11 which interacts with a tension spring 12, which tension spring is not stressed in the standby state in the left-hand part of FIG. 2. The wedge 11 is connected to the end 102 of the flap 1 by way of a cable 8 which is indicated by a dashed line and which is guided over a diverting roller 9. For the establishing of the standby state in the left-hand part of FIG. 1, both the air bladder 4 and the air bladder 7 are filled by the compressor 5 by way of the illustrated valve positions of the valves 601 to 603. Here, it is again the case that a preload is exerted on the flap 1 by way of the air bladder 4, which is achieved by virtue of the fact that, by way of the diversion by way of the cable 8 and the diverting roller 9, the flap is held fixed by virtue of the position of the wedge 11 being fixed by frictional locking with the filled air bladder 7.

If a triggering signal arises, it is the case—as shown in the right-hand part of FIG. 2—that the air bladder 7 is ventilated via the valve 603, which has the effect that the wedge 11 moves in the direction toward the diverting roller 9, owing to the expansion of the air bladder 4, until frictional locking is again produced between the wedge 11 and the air bladder 4. In other words, in this way, a release or unlocking of the flap is effected in the manner of a brake, wherein the adjustment of the flap can be suitably set in a variable manner on the basis of the filling state of the bladder 7.

As emerges from the right-hand part of FIG. 2, the movement of the wedge 11 in the activated state of the actuating device leads to the expansion of the spring 12, such that said spring generates a restoring force. Said restoring force has the effect that, after the ending of the activated state, the wedge is moved back into its position in the standby state in the left-hand part of FIG. 2. In other words, after the ending of the activation of the actuating device, the air bladder 4 is ventilated by virtue of the valve 601 being opened, as a result of which the tension on the cable 8 decreases and, as a result, the restoring force of the spring 12 leads to the contraction of said spring and thus to a return movement of the wedge. Finally, the position of the flap corresponding to the left-hand part of FIG. 1 is attained again, wherein then, the standby state, in which the flap is preloaded by way of the air bladder 4, can be restored by virtue of the air bladders 4 and 7 being filled again.

In summary, in the embodiment of FIG. 2, a triggering of the seat adjustment is achieved in the manner of a brake, wherein, in the standby state, the brake is activated and prevents the movement of the seat contour adjustment. This is achieved by way of the second air bladder 7, wherein some other pneumatic or electromechanical control element may also be used for this purpose. For the triggering of the seat adjustment, the braking action of the second air bladder 7 is targetedly reduced by virtue of air being discharged from the air bladder. When the highest degree of activation has been reached, the discharging of the air from the air bladder is ended, or the braking action is intensified by virtue of the air bladder being rapidly refilled. Alternatively, the valve 603 in this arrangement may also be replaced by a 3/3 valve or by two 2/2 valves, in order in particular that a partially activated state can be maintained for a longer period of time by virtue of the volume of the air bladder 7 required for this purpose being closed off.

The wedge used in the embodiment of FIG. 2 has the advantage that it controls not only the degree of braking force but also the stroke of the brake mechanism. In this way, the speed of the activation of the actuating device or of the seat adjustment can be controlled. In particular, a sudden activation can be slowed, because the first air bladder 4 can expand only to the extent to which the volume of the second air bladder 7 makes space for the broadening wedge.

Figure 3:
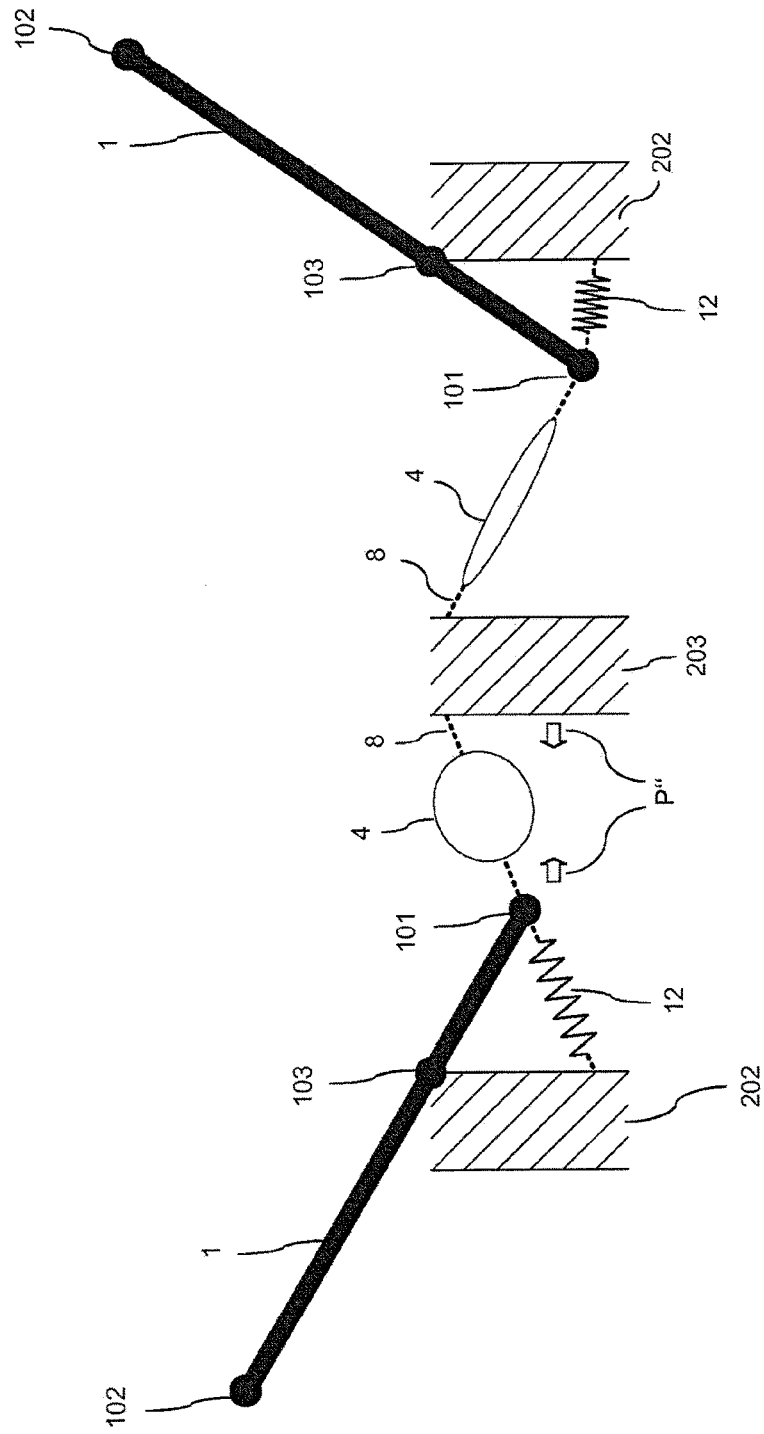
FIG. 3 is a schematic illustration of a third embodiment of an adjustment device according to an aspect of the invention.

FIG. 3 shows a third embodiment of an adjustment device according to an aspect of the invention. In this variant, the flap 1 is articulatedly connected to a structure 202 in the seat by way of a joint 103, such that a lever is produced by way of the flap. Between the end 101 of the flap and the structure 202, there is arranged a tension spring 12. Furthermore, the end 101 of the flap is connected by way of a cable 8 (indicated by way of a dashed line) and interposed air bladder 4 to a further structure 203 in the driver's seat. In the standby state in the left-hand part of FIG. 3, the tension spring 12 is stressed, which is effected by virtue of the air bladder 4 being filled. Said filling causes a shortening of the length of the air bladder 4 in the direction of the arrows P''', and thus to stretching of the spring 12, such that the latter generates a restoring force. In this way, in turn, a preload of the actuating device is realized in the standby position.

By way of a triggering device, which is realized by way of corresponding valves (not illustrated) at the air bladder 4, it is the case that, when the triggering signal arises, ventilation of the air bladder 4 is effected, which leads to the deformation, shown in the right-hand part of FIG. 1, of the air bladder. This in turn has the result that the preload of the tension spring 12 is released, such that the spring contracts until it is relaxed. Here, a rotation of the flap 1 at the joint 103, and thus the corresponding seat adjustment, are effected. The ventilation time of the air bladder 4 is in this case dependent substantially only on the flow resistance of the lines and valves involved, and is thus not limited by the power of a compressor. After the ending of the activated state, by way of a compressor (not shown), the air bladder 4 is filled again via a corresponding valve until the standby state in the left-hand part of FIG. 3 is attained.

Instead of an air bladder for the actuation of the seat adjustment, use may also be made of some other pneumatic stroke element, such as for example a stroke cylinder. Use is however preferably made of the illustrated air bladder, which is composed of a material with low stretching elasticity, which material shortens in the direction along the cable 8 during the filling process. In a specific variant of the air bladder, said air bladder may be constructed from two layers. An inner, elastic and stretchable layer serves in this case for sealing the air bladder against air loss. An outer layer which bears closely against said inner layer is flexible but substantially not stretchable. This may be achieved for example by way of a mesh which does not significantly increase in area when deformed. In the event of stretching of the inner layer during the filling of the air bladder, the outer layer causes a corresponding shortening of the air bladder, as shown in the left-hand part of FIG. 3.

Figure 4:
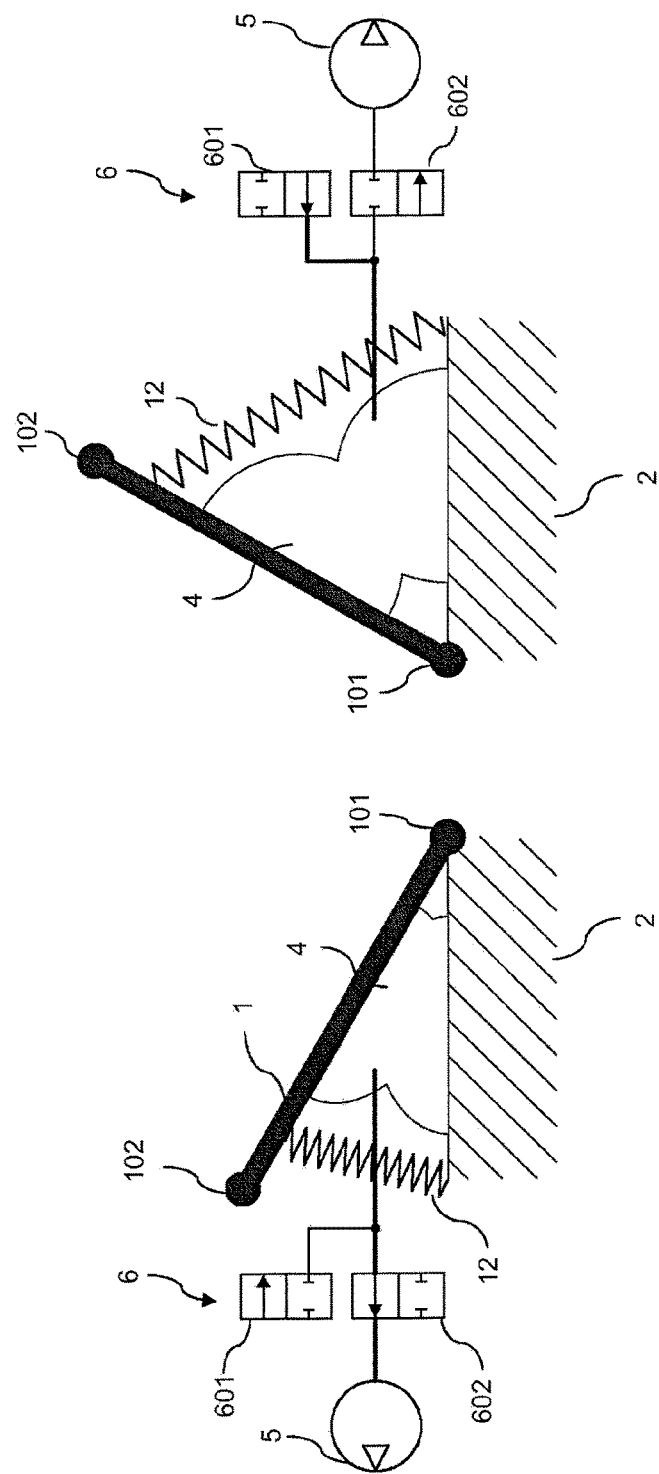
FIG. 4 is a schematic illustration of a fourth embodiment of an adjustment device according to an aspect of the invention.

A further variant of the adjustment device according to an aspect of the invention is schematically shown in FIG. 4. Here, as pneumatic actuating device, use is made of a negative-pressure actuator which comprises an air bladder 4 which is fixedly connected or adhesively bonded both to the flap 1 and to the structure 2. As negative-pressure actuator, use may also be made of a stroke cylinder rather than an air bladder. The air bladder 4 is in turn connected by way of two 2/2 valves 601 and 602 to a compressor in the form of a negative-pressure pump 5. In the adjustment device 4, it is furthermore the case that a spring element 12 is arranged between the structure 2 and the flap 1, which spring element is compressed, and thus preloaded, in the standby state in the left-hand part of FIG. 4.

The standby state is attained by virtue of a negative pressure being generated in the negative-pressure actuator 4 by way of the pump 5, wherein, for this purpose, the valve 602 is situated in the open position. The negative pressure causes a movement of the flap 1 in the direction toward the structure 2, and thus a compression of the spring 12. In this way, in turn, a preload of the pneumatic actuating device in the standby state is realized. After the standby state has been attained, the valve 602 can return into its closed position again. When the triggering signal arises, the valve 601 is opened, as shown in the right-hand part of FIG. 2, whereby the air bladder 4 is connected to ambient air and an expansion of the air bladder is realized by way of the restoring force of the spring 12, until the latter is in the relaxed state. If appropriate, the valve 601 may also be connected to a positive-pressure pump, which rapidly fills the air bladder such that the activated state of the seat adjustment means is attained in a short time. After the ending of the activated state, the air bladder 4 is contracted again by way of the negative-pressure pump 5, until the standby state shown in the left-hand part of FIG. 4 is attained.

In all of the above-described variants of the seat adjustment according to an aspect of the invention, the establishing of the corresponding standby state is always effected at an early point in time such that the standby state also prevails when triggering signals arise. In particular, the establishing of the standby state may be effected immediately after the opening of a vehicle door or the operation of a function for gaining access to the vehicle (for example opening of the vehicle using a radio key). Likewise, the establishing of the standby state may also be performed after the switching-on of the ignition of the vehicle or after the switching-on of an associated function for contour adjustment. Furthermore, the transfer into the standby state is always effected immediately after the ending of a corresponding contour adjustment, such that the contour adjustment is also available again when the next triggering signal arises.

The embodiments of the invention described above have numerous advantages. In particular, by way of the mechanical preload of the adjustment device according to the invention, a fast contour adjustment can be realized. Here, the preload may be built up slowly and with a low level of power of the pneumatic pressure-generating means used. Thus, it is possible for a seat adjustment to be realized with considerably reduced costs, lower energy usage and a lower system weight and smaller structural space.

LIST OF REFERENCE DESIGNATIONS

1 Flap
101, 102 Ends of the flap
103 Joint
2, 202, 203 Structure
201 Projection
3 Flap
301 Projection
4 Air bladder
5 Compressed-air supply
6 Valve arrangement
601, 602, 603 Valves
7 Air bladder
8 Cable
9 Diverting roller
10 Guide
11 Wedge
12 Tension spring
P, P', P'' Arrows

The invention claimed is:

1. An apparatus for pneumatic adjustment of a contour of a seat in a transportation means, having one or more adjustment devices, each comprising a movable flap which forms a part of the contour of the seat, a pneumatic actuating device comprising a first air bladder which presses against the movable flap and moves the movable flap by way of pneumatic generation of pressure, and a triggering device by way of which the actuating device is, during an operation of the apparatus, transferred from a standby state into an activated state in response to a triggering signal, wherein the first air bladder of the pneumatic actuating device moves the movable flap to effect the adjustment of the contour of the seat when in the activated state,
wherein the pneumatic actuating device is designed such that it is mechanically preloaded in the standby state, and the mechanical preload is released in the activated state in order to thereby effect the adjustment of the contour of the seat,
wherein the movable flap is held in a static position when the pneumatic actuating device is in the standby state, and
wherein the first air bladder can be filled by way of a compressed-air supply, wherein, when the pneumatic actuating device is in the standby state, the flap is arrested, and in response to the triggering signal, the arresting of the flap is released, which effects the expansion of the first air bladder and, as a result, movement of the flap for the adjustment of the contour of the seat.

2. The apparatus as claimed in claim 1, wherein the pneumatic actuating device in at least one of the one or more adjustment devices is designed such that, in the standby state, a positive pressure or a negative pressure is generated in the pneumatic actuating device.

3. The apparatus as claimed in claim 1, wherein the flap extends, at one side of a backrest of the seat, in a longitudinal direction of the backrest.

4. The apparatus as claimed in claim 1, wherein the flap can be arranged in multiple different positions when the pneumatic actuating device is in the activated state.

5. The apparatus as claimed in claim 1, wherein the arresting of the flap when the pneumatic actuating device is in the standby state is effected by way of positive locking and/or frictional locking.

6. The apparatus as claimed in claim 1, wherein the first air bladder is connected to the compressed-air supply by way of a valve arrangement composed of one or more valves, in such a way that, by way of control of the valve arrangement, filling of the first air bladder by way of the compressed-air supply for the purposes of establishing the standby state, and an evacuation of the air bladder after an ending of the activated state, are achieved, wherein automatic arresting of the flap is preferably effected upon the evacuation of the first air bladder.

7. The apparatus as claimed in claim 1, wherein in at least one of the one or more adjustment devices, the establishing of the standby state of the actuating device is coupled to one or more actions of a user, wherein the action or actions comprises one or more of the following actions in a transportation means in the form of a motor vehicle:
opening a vehicle door of the motor vehicle;
operating a function for gaining access to the motor vehicle;
switching on the ignition of the motor vehicle; and
operating a function for activating a seat adjustment.

8. The apparatus as claimed in claim 1, wherein immediately after an ending of the activated state of the pneumatic actuating device, the operating state is re-established.

9. A transportation means, wherein the transportation means comprises one or more apparatuses as claimed in claim 1 for the adjustment of one or more seats in the transportation means.

10. The apparatus as claimed in claim 1, wherein the triggering device in at least one of the one or more adjustment devices comprises a second air bladder which is filled or evacuated, and thereby transfers the actuating device from the standby state to the activated state, in response to the triggering signal.

11. The apparatus as claimed in claim 10, wherein the filling of the second air bladder is effected using compressed air from the compressed-air supply or compressed air from the first air bladder.

12. An apparatus for pneumatic adjustment of a contour of a seat in a transportation means, having one or more adjustment devices, each comprising a movable flap which forms a part of the contour of the seat, a pneumatic actuating device comprising a first air bladder which presses against the movable flap and moves the movable flap by way of pneumatic generation of pressure, and a triggering device by way of which the actuating device is, during an operation of the apparatus, transferred from a standby state into an activated state in response to a triggering signal, wherein the first air bladder of the pneumatic actuating device moves the movable flap to effect the adjustment of the contour of the seat when in the activated state,
wherein the pneumatic actuating device is designed such that it is mechanically preloaded in the standby state, and the mechanical preload is released in the activated state in order to thereby effect the adjustment of the contour of the seat,
wherein the movable flap is held in a static position when the pneumatic actuating device is in the standby state, and
wherein there is a further flap articulatedly connected to the flap which, when the pneumatic actuating device is in the standby state, effects arresting of the flap by way of positive locking, wherein the triggering device releases the positive locking, by exertion of force on the further flap, in response to the triggering signal.

13. An apparatus for pneumatic adjustment of a contour of a seat in a transportation means, having one or more adjustment devices, each comprising a movable flap which forms a part of the contour of the seat, a pneumatic actuating device comprising a first air bladder which presses against the movable flap and moves the movable flap by way of pneumatic generation of pressure, and a triggering device by way of which the actuating device is, during an operation of the apparatus, transferred from a standby state into an activated state in response to a triggering signal, wherein the first air bladder of the pneumatic actuating device moves the movable flap to effect the adjustment of the contour of the seat when in the activated state,
wherein the pneumatic actuating device is designed such that it is mechanically preloaded in the standby state, and the mechanical preload is released in the activated state in order to thereby effect the adjustment of the contour of the seat,
wherein the movable flap is held in a static position when the pneumatic actuating device is in the standby state, and
wherein the triggering device is designed such that it can stop movement of a wedge-shaped or stepped element in a guide at different positions in the guide by way of frictional locking, wherein the movement of the wedge-shaped or stepped element is effected by way of the release of the mechanical preload of the pneumatic actuating device in the activated state.

14. An apparatus for pneumatic adjustment of a contour of a seat in a transportation means, having one or more adjustment devices, each comprising a movable flap which forms a part of the contour of the seat, a pneumatic actuating device comprising a first air bladder which presses against the movable flap and moves the movable flap by way of pneumatic generation of pressure, and a triggering device by way of which the actuating device is, during an operation of the apparatus, transferred from a standby state into an activated state in response to a triggering signal, wherein the first air bladder of the pneumatic actuating device moves the movable flap to effect the adjustment of the contour of the seat when in the activated state,
wherein the pneumatic actuating device is designed such that it is mechanically preloaded in the standby state, and the mechanical preload is released in the activated state in order to thereby effect the adjustment of the contour of the seat,
wherein the movable flap is held in a static position when the pneumatic actuating device is in the standby state, and
wherein the pneumatic actuating device comprises a negative-pressure actuator in which, in the standby state, a negative pressure is generated and, as a result, the flap is mechanically preloaded by a restoring force of an elastic element, wherein, in the activated state, the negative pressure is reduced and, in this way, the restoring force of the elastic element effects a movement of the flap.

15. An apparatus for pneumatic adjustment of a contour of a seat in a transportation means, having one or more adjustment devices, each comprising a movable flap which forms a part of the contour of the seat, a pneumatic actuating device comprising a first air bladder which presses against the movable flap and moves the movable flap by way of pneumatic generation of pressure, and a triggering device by way of which the actuating device is, during an operation of the apparatus, transferred from a standby state into an activated state in response to a triggering signal, wherein the first air bladder of the pneumatic actuating device moves the movable flap to effect the adjustment of the contour of the seat when in the activated state, wherein the pneumatic actuating device is designed such that it is mechanically preloaded in the standby state, and the mechanical preload is released in the activated state in order to thereby effect the adjustment of the contour of the seat, wherein the movable flap is held in a static position when the pneumatic actuating device is in the standby state, and wherein the flap forms, by way of an articulated connection, a lever, and the pneumatic actuating device acts, by way of an elastic element and a pneumatic stroke element, on one end of the lever, wherein the elastic element is mechanically preloaded by way of the pneumatic stroke element in the standby state of the pneumatic actuating device, and wherein, when the pneumatic actuating device is in the activated state, the mechanical preload of the elastic element is released by way of the stroke element, and in this way, the movement of the flap is effected.

16. The apparatus as claimed in claim 15, wherein the pneumatic stroke element comprises at least one of a stroke cylinder, a positive-pressure actuator, and an air bladder, wherein the air bladder comprises an inner, stretchable layer and an outer, flexible and non-stretchable layer, such that stretching of the inner layer during filling of the air bladder gives rise to a shortening of the air bladder in a predetermined direction, wherein the shortening of the air bladder effects the mechanical preloading of the elastic element.

* * * * *